J. O. MANTOOTH.
HAY LOADER.
APPLICATION FILED SEPT. 18, 1916.
1,219,020.
Patented Mar. 13, 1917.
4 SHEETS—SHEET 4.
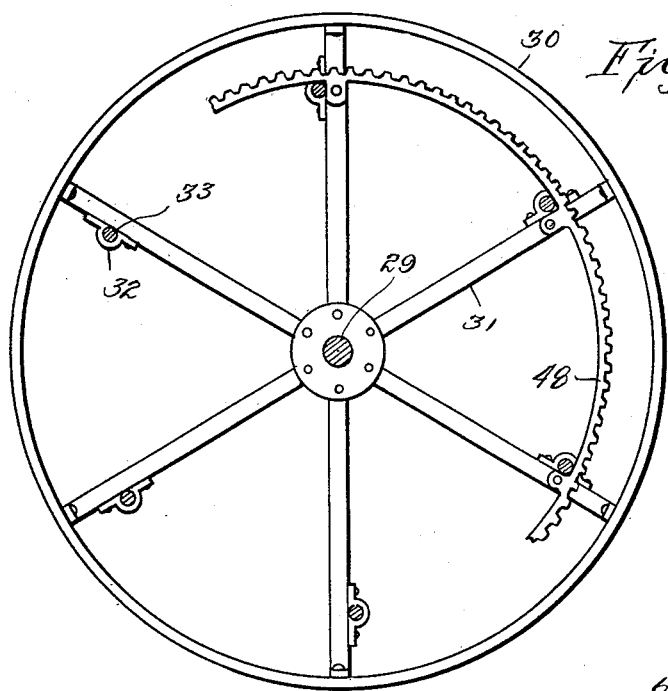
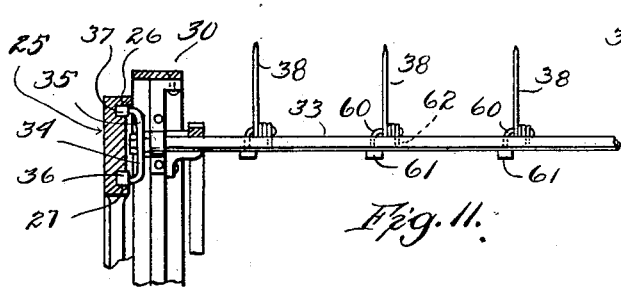
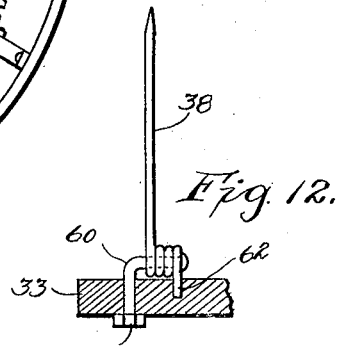
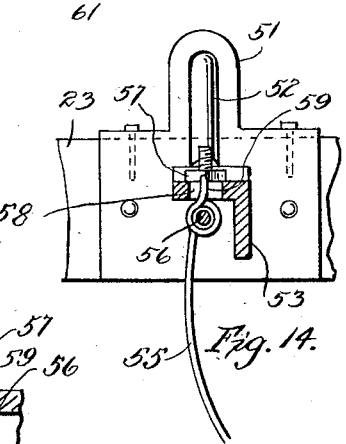

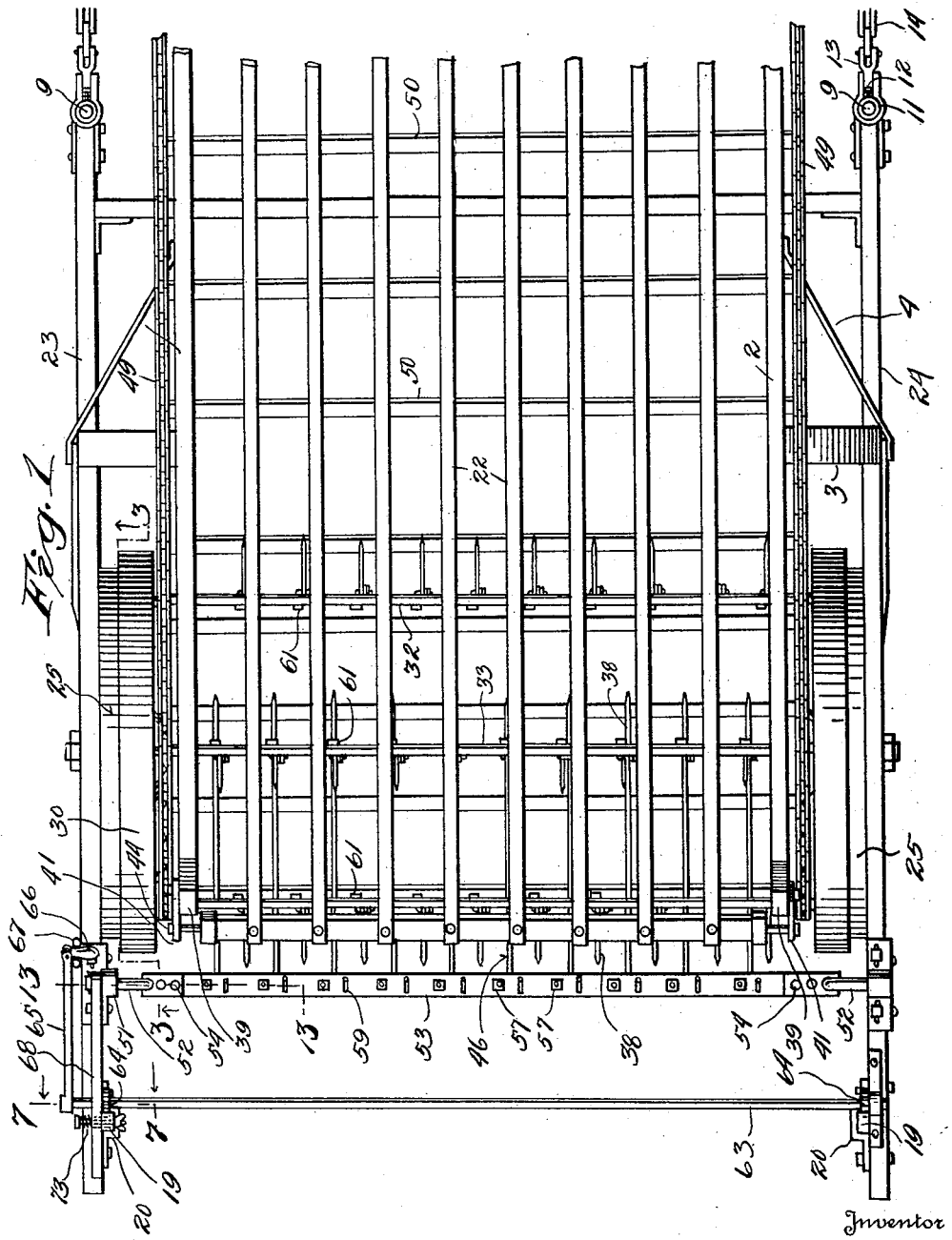

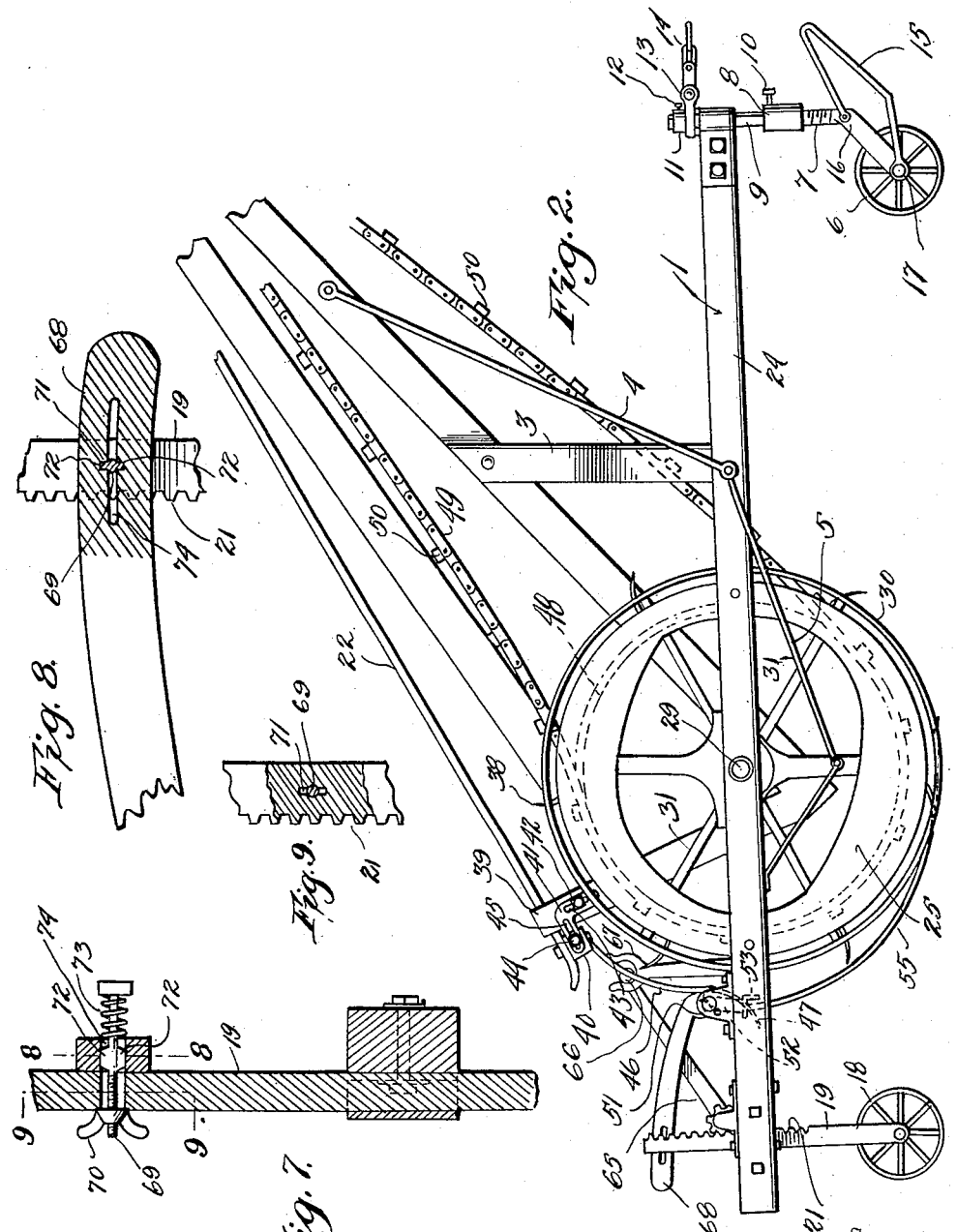

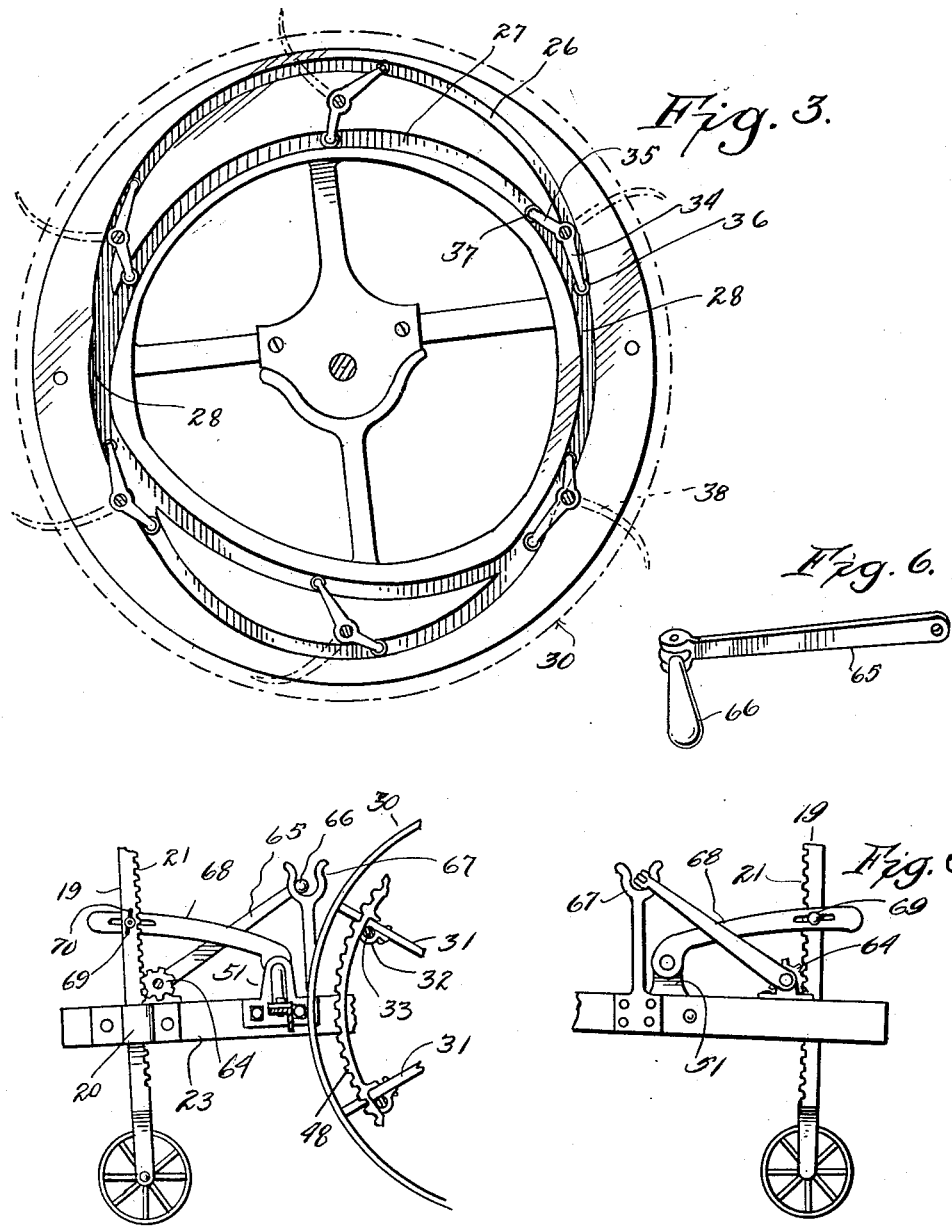

UNITED STATES PATENT OFFICE.

JOSEPH O. MANTOOTH, OF NEWPORT, ARKANSAS.

HAY-LOADER.

1,219,020.  Specification of Letters Patent.  Patented Mar. 13, 1917.

Application filed September 18, 1916. Serial No. 120,743.

*To all whom it may concern:*

Be it known that I, JOSEPH O. MANTOOTH, a citizen of the United States, residing at Newport, in the county of Jackson, State of Arkansas, have invented certain new and useful Improvements in Hay-Loaders; and I do hereby declare the following to be a full, clear, and exact description of the invention, such as will enable others skilled in the art to which it appertains to make and use the same.

This invention relates to a hay loader.

An object of the invention resides in the provision of a machine wherein the hay lifting drum may be readily raised and lowered to inoperative or operative positions, respectively.

A further object of the invention resides in so constructing the machine that upon the raising and lowering of the drum the gathering or rake teeth will be raised or lowered.

A still further object of the invention resides in the provision of novel means for projecting and retracting the lifting teeth.

With these and other objects in view, such as will appear as my description progresses, my invention comprises the combination and arrangement of parts as set forth in and falling within the scope of the appended claims.

In the drawings:

Figure 1 is a plan view of a machine constructed in accordance with my invention, parts thereof being broken away;

Fig. 2 is a side elevation of the same;

Fig. 3 is a section on line 3—3 of Fig. 1 showing the adjacent wheel and the lifting teeth in construction lines;

Fig. 4 is an enlarged detail of the means for raising and lowering the rear of the frame and the means for moving the gathering or rake teeth;

Fig. 5 is a similar view looking at the opposite side of the aforementioned means;

Fig. 6 is a detail perspective view of the crank handle used in the aforementioned means;

Fig. 7 is an enlarged sectional view on line 7—7 of Fig. 1, showing the manner in which the gathering or rake teeth controlling lever is secured to the vertical wheel standard;

Fig. 8 is an enlarged sectional view, on line 8—8 of Fig. 7, of the said lever and standard taken at right angles to Fig. 7;

Fig. 9 is a similar view, on line 9—9 of Fig. 7, showing the manner in which the locking pin passes through the standard;

Fig. 10 is a detail of one wheel showing the manner in which the transverse rods of the drum are mounted on the spokes thereof;

Fig. 11 is a detail sectional view showing the manner in which the lifting-tooth operating-cams are mounted;

Fig. 12 is a detail showing the manner in which each of said teeth is mounted;

Fig. 13 is a detail sectional view, on line 13—13 of Fig. 1, showing the manner in which each of the gathering or rake teeth is mounted and showing also the manner in which the bar which carries said teeth is mounted, and Fig. 14 is a sectional view, on line 14—14 of Fig. 13, taken at right angles to Fig. 13.

The embodiment of my invention illustrated in the drawing includes a horizontal or bed frame 1 from which an upwardly inclined or conveyer frame 2 extends, which frame is braced by suitable supports 3, 4 and 5. The forward end of the frame 1 is supported by a wheel 6 which is mounted on a standard 7. This standard is in screw threaded engagement with a sleeve 8 which is vertically adjustable on a rod 9, being held in its adjusted position by a set screw 10. To the upper end of this rod 9, which rod is held in place by a collar 11 and a set screw 12, is a clevis 13 to which the draft attaching means 14 is secured. A hay deflector 15 in the form of a pair of pieces of bent wire is secured to the standard 7, at 16, and at the pivot 17 of the wheel 6. This deflector is arranged to force the hay toward the ground as the machine passes thereover. The rear end of the frame 1 is supported by a pair of wheels 18 which are mounted on standards 19, which standards slide vertically through bearings 20 and are provided with rack teeth 21 for a purpose which will later be described. A plurality of guide strips 22 for the hay in its passage upwardly from the frame 2 are provided.

Mounted on the side bars 23 and 24 of the frame 1, rigidly, are castings 25 which are of the form illustrated in Fig. 3 of the drawing. Each of these castings is provided with a pair of cam tracks 26 and 27 which are eccentric to each other and merge at 28 on each side of the casting. Extending transversely of the frame 1 is a shaft 29 on which a pair of wheels 30 is mounted, which wheels are provided with a plurality of spokes 31. Extending between the corresponding spokes of these wheels and mounted rotatably in bearings 32 are rods 33 on each end of each of which rods a pair of diverging arms 34 and 35 is mounted, rigidly. Rollers 36 and 37 are mounted on these arms 34 and 35 and the roller 36 follows the cam track 26 while the roller 37 follows the cam track 27 as illustrated in Fig. 3 of the drawing. This figure illustrates the various positions of the arms 34 and 35 during the rotation of the wheels. Secured to each of the rods 33 is a plurality of lifting teeth 38 which are adapted to be projected from the periphery of each of the castings 25 and to be retracted within the same. It will be obvious that as these wheels 30 rotate and with them the rods 33 that the hay upon the ground will be engaged by the teeth 38 and lifted as the raking reel, which is formed by the rods 32 and the wheels 30, rotates. The retracting of each tooth 38 occurs when the tooth reaches its uppermost position and the hay is being discharged onto a conveyer which will later be described and also occurs when each tooth reaches its lowermost position. The projection of the teeth, however, occurs immediately after the teeth pass their lowermost position and also after they pass their uppermost position because of the peculiar formation of the cam tracks 26 and 27. This will insure the discharge of the hay from the raking reel and also the protection of the teeth when they are in their lowermost positions.

Adjustably secured to the bars 39 of the frame 2 is a beam 40 which extends transversely between the bars. This beam is secured to the bars 39 by angle irons 41, the angle irons being held adjustably on the bars by bolts 42 and 44 which pass through slots 45 in the angle irons. Secured to and depending from the beam 40 is a plurality of spaced guide rods 46 which are arcuate in form and have their lower ends 47 extending toward the rear of the frame 1. These rods 46 are spaced from the raking reel so that the hay which is carried upwardly by the teeth 38 may pass beneath the same. Secured to each of the wheels 30 is a sprocket 48, around which sprockets the conveyer chains 49 pass. These chains are provided with the usual conveyer strips 50 to lift the hay. Mounted in bearings 51 on the side bars 24 of the frame 1 are crank members 52 to which an angularly shaped bar 53 is secured by bolts 54. A plurality of rake teeth 55 depends from this bar 53. These teeth are made of resilient material and are at their upper ends, coiled about angular and vertically adjustable pins 56 which are held in place on the bar 53 by nuts 57. These pins 56 extend through openings in the bar 53. The upper ends 59 of the teeth extend into slots 58 in the bar 53 so that the teeth may have slight play. The teeth 38, previously described, are likewise formed of resilient metal and are secured to pins 60 which are held upon the rods 33 by nuts 61, the teeth being prevented from movement relative to the rod by their ends 62 which project into the rod as clearly illustrated in Figs. 11 and 12 of the drawing. The teeth 55 are arcuate in form and extend downwardly in spaced relation to the raking reel and are curved toward the forward end of the frame 1.

In order that the frame 1 may be raised and lowered by means of the wheels 18 and their standards 19, I have mounted a shaft 63 in bearings on the side bars 24 of the frame 1. Secured to each end of this shaft 63 is a pinion 64, which pinions mesh with the racks 21 on the standards 19. A crank handle 65 is secured to one end of this shaft 63 and is provided with a pivoted grip member 66. When the handle is in the position shown in Fig. 4 of the drawing this grip portion 66 will rest in a suitable clip 67 to maintain the standards in their adjusted positions. When, however, the crank handle 65 is swung through substantially a 45 degree angle the standards 19 will be moved downwardly and the rear of the frame raised. Inasmuch as the handle 65 must pass the adjacent standard 19 in this movement the grip portion 66 is pivoted thereto as shown in Fig. 6 of the drawing so that it may be, after having been detached from the clip 67, swung through an angle of 180 degrees to permit its passing the said adjacent standard 19.

In order that the points of teeth 55 may be raised from the ground and swung toward the raking reel when the rear end of the frame 1 is raised, I have provided a lever 68 which is secured to the crank member 52 and projects across one face of the adjacent standard 19. Extending through this standard 19 is a locking bolt 69 which is provided with a winged nut 70, the hole in the standard through which the bolt extends, being provided with enlargements 71 as illustrated in Fig. 9 of the drawing. This bolt 69 is provided with a pair of wings 72 which are normally held within a complementally shaped recess in the lever 68 by a coil spring 73, the recess being formed in a slot 74 which is formed longitudinally of the lever 68. When these wings 72 are in engagement with the lever 68 the sliding movement of the lever 68 across the standard 19 is prevented and consequently the teeth 55 are locked in their raised positions and the standards 19 are locked in their raised positions. When, however, the nut 70 is adjusted to draw the wings 72 within the standard 19 the lever 68 may have movement relative to the standard and the teeth 55 may be swung to their lowered positions upon the operation of the crank handle 65.

In operation when the wheels 30 are permitted to rest upon the ground and the machine is drawn forwardly the raking reel which includes the wheels will be rotated and the teeth 38 automatically projected and retracted during said rotation. The hay will be gathered by the teeth 55 from which it will be lifted by the teeth 38 onto the conveyer, being guided onto the latter by the rods 46 and during its movement with the conveyer by the strips 22.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:

1. In a hay loader, the combination with a frame and ground engaging wheels carried thereby; of a pair of castings mounted on said frame adjacent said wheels, each casting having a pair of cam tracks, a plurality of rods extending between the spokes of said wheels and having bearings thereon and also extending between said castings, diverging arms on the ends of said rods, rollers on said arms operable in said tracks, certain of said rollers engaging certain of said tracks, and a plurality of teeth carried by each of said rods.

2. In a hay loader, the combination with a frame, a raking reel carried thereby; of a plurality of guide rods mounted in spaced relation to the reel, a bar for supporting said rods, means for raising and lowering said frame to vertically adjust said rods, means for also adjusting said rods to and away from said reel, a plurality of rake teeth, and means for moving the ends of said teeth to and away from said reel independently of the adjustment of said rods.

3. In a hay loader, the combination with a horizontal frame, of a pair of vertically arranged toothed standards adjustably connected to the rear end thereof and movable at right angles thereto, wheels on said standards, a shaft extending transversely of said frame, pinions on said shaft and engaging the teeth on said standards, a crank handle secured to said shaft, and means carried by said frame and engaging said handle for securing said standards in various positions.

4. In a hay loader, the combination with a frame, of toothed supporting standards at the rear end thereof, a raking reel, a pair of crank members mounted on the frame, a tooth carrying beam secured to said crank members, a shaft extending transversely of the frame, pinions on the shaft intermeshing with the teeth on the standards, a lever connected to one crank member and having a slot therein, a locking bolt extending through said slot and the adjacent standard and means for adjusting the frame on the standards when the bolt is released.

In testimony whereof, I affix my signature, in the presence of two witnesses.

JOSEPH O. MANTOOTH.

Witnesses:
I. I. HARRIS,
WILL CLAYCOMB.

Copies of this patent may be obtained for five cents each, by addressing the "Commissioner of Patents, Washington, D. C."